Aug. 23, 1932.       R. K. LEE       1,872,765
MOTOR MOUNTING
Filed Feb. 24, 1930
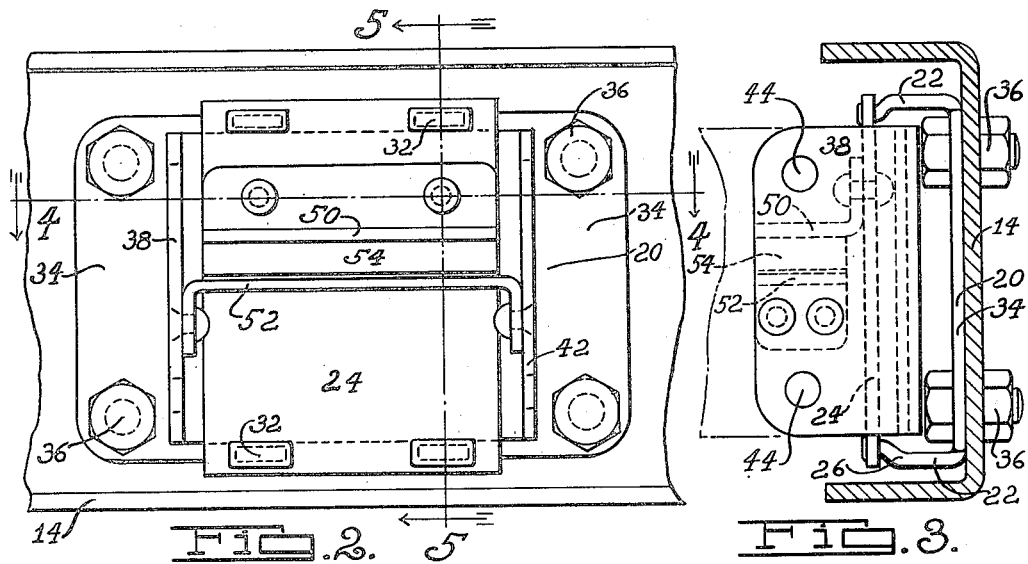
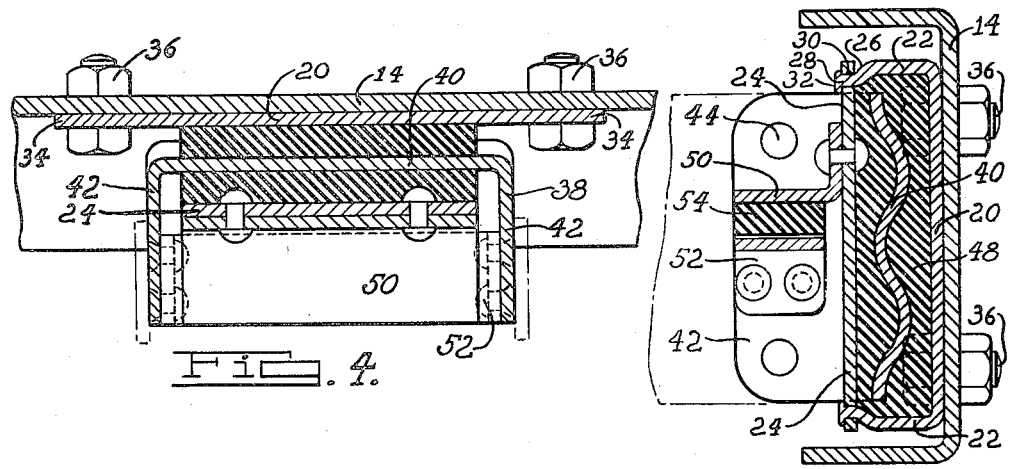
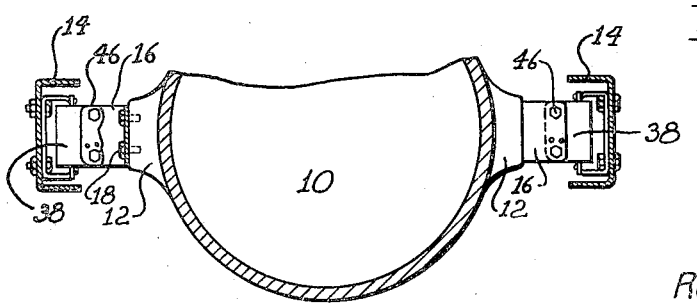
INVENTOR
ROGER K. LEE.
BY
ATTORNEY Patented Aug. 23, 1932

1,872,765

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

MOTOR MOUNTING

Application filed February 24, 1930. Serial No. 430,630.

This invention relates to a mounting and more particularly to a mounting adapted to dampen out vibrations between a member such as an internal combustion engine and its support.

An important object of the invention is to provide an inexpensive mounting of resilient material having a given resiliency within certain limits of deflection and a less resiliency beyond those limits of deflection.

Another object of the invention is to provide a corrugated member between spaced members which forms either a support or a member adapted to be supported. The corrugated member is embedded in rubber with the opposite faces of the rubber secured to the adjacent faces of the spaced members.

Another object of the invention is to provide a resilient connection between a supporting member and a member to be supported which resiliently secures the two members together. Another resilient means is secured to one of the members and spaced from the other of the members so that the supporting member has a limited relative movement with respect to the member to be supported for a given deflection. Beyond that limited movement the second resilient member comes in contact with the member from which it is spaced and changes the rate of deflection between the two members.

Other objects and advantages of the invention will more fully appear from the following description taken in connection with the accompanying drawing, in which:

Fig. 1 is a sectional view showing a portion of an internal combustion engine supported between the side members of a chassis frame illustrating an embodiment of my invention.

Fig. 2 is a side elevation showing an enlarged view of the mounting secured to a side frame member.

Fig. 3 is an end view of Fig. 2.

Fig. 4 is a sectional view taken on line 4—4 of Fig. 2.

Fig. 5 is a sectional view taken on line 5—5 of Fig. 2.

Referring to the illustrated embodiment of my invention, I have shown an internal combustion engine 10 having laterally projecting arms 12. Side frame members 14 have been illustrated as the frame members of an automobile chassis adapted to form the support for the engine 10. A U-shaped stamping 16 is detachably secured to the outer ends of the arms 12 by bolts 18 and the outwardly extending flanges of the U-shaped member 16 are provided with openings to receive inwardly extending arms on the mounting hereinafter more fully referred to.

The mounting which forms a connection between one side frame member and a U-shaped stamping 16 is provided with a metallic plate like member 20 having its upper and lower edges bent inwardly forming flanges 22, to which is secured a plate like member 24. A shoulder 26 is provided adjacent the ends of the flanges 22 and projections 28 are received in the openings 30 in the plate like member 24. The ends of the projections are peened over, as at 32, to hold the plate like member 24 on the ends of the projections 28. It will be noted that the plate like members 20 and 24 are spaced apart and that these two plates together with the flanges 22 form a hollow rectangular member which is secured to the frame 14.

The plate like member 20 is provided with lateral flanges 34 having openings for the reception of bolts 36 extending through openings in the frame member 14. A U-shaped member 38, preferably a stamping, has its intermediate portion 40 corrugated, as shown in Fig. 5, and spaced between the adjacent faces of the plate like members 20 and 24. The side flanges 42 of the U-shaped member 38 extend inwardly around opposite sides of the plate like member 24. The flanges 42 are provided with openings 44 adapted to register with corresponding openings in the flanges of the U-shaped member 16 and bolts 46 secure the resilient mounting to the U-shaped member 16.

Between the spaced members 20 and 24 I have provided a resilient material 48, such as rubber, which embraces the opposite faces and edges of the intermediate portion 40 of the U-shaped member 38. The rubber is preferably vulcanized throughout its contacting area to the members 40, 20 and 24.

It will be understood that there is relative movement between the rectangular member, which is secured to the frame, and the U-shaped member 38, which is secured to the motor, and that this relative movement has a definite rate of deflection, determined by the resiliency of the rubber embracing the corrugated portion 40 between the spaced members 20 and 24.

As a means for changing this rate of deflection beyond the predetermined rate, I have provided a member 50 on the plate 24 and another member 52 on a flange of the U-shaped member 38. The members 50 and 52 project inwardly in over-lapping relation with each other and are spaced apart. Between these over-lapping portions I have provided another resilient block 54, preferably of rubber, which is secured to either of the members 50 or 52 and spaced from the other of the members. The relative movement of the member 50, carried by the hollow rectangular member with that of the member 52, carried by the U-shaped member 38, is free within certain limits determined by the space between the member 52 and the resilient member 54.

When the resilient member 54 comes in contact with the member 52, it will be understood that the resilient member 54 yieldingly restricts the relative movement between the supporting member and the member to be supported. This restriction is in addition to the resilient restriction between the hollow rectangular member and the portion 40 of the U-shaped member 38.

The member 52 shown on the drawing is formed from a channel shaped stamping securing the flanges 42 of the U-shaped member 38 together. The upper surface of the member 52 receives the lower surface of the resilient member 54. The member 50 is shaped in the form of an angle having one of its flanges secured to the plate 24 with the other flange of the angle extending over the central portion of the member 52. The resilient member 54 is preferably vulcanized to the undersurface of the over-lapping flange of the member 50.

It will be understood that various changes, including the size, shape and arrangement of parts, may be made without departing from the spirit of my invention, and it is my intention to cover by my claims such changes as may be reasonably included within the scope thereof.

I claim:

1. A mounting comprising a rectangular member formed from stampings having two flat plate-like portions spaced from each other in overlapping relation, a U-shaped member having lateral flanges and an intermediate portion, rubber embracing said intermediate portion filling the space between the spaced portions and vulcanized thereto, a bracket beyond the spaced portions secured to said lateral flanges, a bracket in spaced overlapping relation with said bracket and carried by said rectangular member, and rubber between said brackets, the rubber between the spaced portions of said rectangular member being under tension by relative movement of said U-shaped member and said rectangular member in one direction and the rubber between said brackets being under compression by excessive relative movement of said members in the same direction.

2. A mounting comprising a rectangular member formed from stampings having two flat plate-like portions spaced from each other in overlapping relation, a U-shaped member having lateral flanges and an intermediate corrugated portion, rubber embracing said intermediate portion filling the space between the spaced portions and vulcanized thereto, a bracket beyond the spaced portions secured to said lateral flanges, a bracket in spaced overlapping relation with said bracket and carried by said rectangular member, and rubber between said brackets, the rubber between the spaced portions of said rectangular member being under tension by relative movement of said U-shaped member and said rectangular member in one direction and the rubber between said brackets being under compression by excessive relative movement of said members in the same direction.

3. A mounting comprising a rectangular member formed from stampings having two flat plate-like portions spaced from each other in overlapping relation, a U-shaped member having lateral flanges and an intermediate corrugated portion, rubber embracing said intermediate portion filling the space between the spaced portions and vulcanized thereto, the rubber between the spaced portions of said rectangular member being under tension by relative movement of said U-shaped member and said rectangular member in one direction and the corrugations of the intermediate portion of said U-shaped member extending in a plane at right angles to the direction of movement for causing tension on said rubber.

ROGER K. LEE.